United States Patent
Kodama et al.

(10) Patent No.: US 9,868,401 B2
(45) Date of Patent: Jan. 16, 2018

(54) LID ATTACHED STORAGE DEVICE

(71) Applicant: TOYODA GOSEI CO., LTD., Kiyosu-shi, Aichi-ken (JP)

(72) Inventors: Yasuhiro Kodama, Kiyosu (JP); Kiyoshi Kimura, Kiyosu (JP); Hiroshi Zushi, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 77 days.

(21) Appl. No.: 15/156,681

(22) Filed: May 17, 2016

(65) Prior Publication Data

US 2016/0339847 A1  Nov. 24, 2016

(30) Foreign Application Priority Data

May 19, 2015  (JP) .................. 2015-101613

(51) Int. Cl.
| | |
|---|---|
| *B60R 7/00* | (2006.01) |
| *B60R 7/04* | (2006.01) |
| *E05B 83/32* | (2014.01) |
| *E05C 9/00* | (2006.01) |
| *E05C 9/04* | (2006.01) |

(52) U.S. Cl.
CPC ............. *B60R 7/04* (2013.01); *E05B 83/32* (2013.01); *E05C 9/002* (2013.01); *E05C 9/041* (2013.01)

(58) Field of Classification Search
CPC .................................. B60R 7/04; E05B 83/32
USPC ............................................ 296/37.8, 24.34
See application file for complete search history.

(56) References Cited

U.S. PATENT DOCUMENTS

| 7,407,200 B2* | 8/2008 | Ichimaru ................. E05B 83/30 |
| | | 292/194 |
| 8,740,265 B2* | 6/2014 | Gillis ...................... E05B 83/32 |
| | | 292/199 |
| 8,925,989 B2* | 1/2015 | Appelboum ............. B60R 7/04 |
| | | 296/24.34 |
| 2003/0047955 A1* | 3/2003 | Bruhnke .................. B60R 7/04 |
| | | 296/37.8 |
| 2010/0156128 A1* | 6/2010 | Dexter ................... B60N 2/305 |
| | | 296/24.34 |
| 2010/0244478 A1* | 9/2010 | DePue ................. B60N 2/4646 |
| | | 296/24.43 |

(Continued)

FOREIGN PATENT DOCUMENTS

| JP | 2004-217118 A | 8/2004 |
| JP | 2008-296672 A | 12/2008 |

(Continued)

*Primary Examiner* — Joseph D Pape

(74) *Attorney, Agent, or Firm* — Posz Law Group, PLC

(57) ABSTRACT

A lid attached storage device includes: a box body having an opening; left and right lid bodies configured to cover left and right sides of the opening; and left and right opening and closing mechanisms configured to respectively cause the left and right lid bodies to be slidable in the front and rear direction and rotatable in the up and down direction with respect to the box body, each of the left and right opening and closing mechanisms including: a base member; a rotational support portion configured to support the base member so as to be rotatable in the up and down direction about a left or right side of the box body with respect to the box body; and a slide portion configured to slide the lid body in the front and rear direction with respect to the base member.

4 Claims, 15 Drawing Sheets

(56) References Cited

U.S. PATENT DOCUMENTS

| | | | | |
|---|---|---|---|---|
| 2011/0227359 A1* | 9/2011 | Fesenmyer | ............ | B60N 2/4606 |
| | | | | 296/24.34 |
| 2015/0258923 A1* | 9/2015 | Skapof | ................. | B60N 2/4606 |
| | | | | 296/24.34 |
| 2017/0232902 A1* | 8/2017 | Keller | ........................ | B60R 7/04 |
| | | | | 296/24.34 |

FOREIGN PATENT DOCUMENTS

| JP | 2009-119960 A | 6/2009 |
|---|---|---|
| JP | 2010-163031 A | 7/2010 |

* cited by examiner

LID ATTACHED STORAGE DEVICE

CROSS-REFERENCE TO RELATED APPLICATION(S)

This application is based upon and claims the benefit of priority from Japanese Patent Application No. 2015-101613, filed on May 19, 2015, the entire contents of which are incorporated herein by reference.

BACKGROUND

1. Field of the Invention

The present invention relates to a lid attached storage device.

2. Description of the Related Art

In recent years, a lid attached storage device called a console box is provided in a center console disposed in the middle of front-row seats of a vehicle interior. As an example of the lid attached storage device, there is known a lid attached storage device of which a lid body is slid in the front and rear direction to be used as an elbow rest (see JP-A-2008-296672).

As another example of the lid attached storage device, there is known a gate-fold-type lid attached storage device of which a lid body is divided at a center in the left and right direction and the divided lid bodies are opened from the center toward both left and right sides (see JP-A-2010-163031, JP-A-2009-119960, and JP-A-2004-217118).

Here, there has been a desire for a storage device with a gate-fold-type lid body adapted to be slidable and openable/closeable at both left and right sides thereof. Also, a gate-fold-type lid body having satisfactory operability has been demanded.

SUMMARY

The present invention is made in view of these circumstances and an object of the present invention is to provide a gate-fold-type lid attached storage device of which a lid body is operated satisfactorily.

According to one aspect of the invention, there is provided a lid attached storage device including: a box body having an opening; a pair of left and right lid bodies configured to cover left and right sides of the opening; and a pair of left and right opening and closing mechanisms configured to respectively cause the pair of left and right lid bodies to be slidable in the front and rear direction and rotatable in the up and down direction with respect to the box body, each of the pair of left and right opening and closing mechanisms including: a base member, provided between the box body and the lid body; a rotational support portion configured to support the base member so as to be rotatable in the up and down direction about a left or right side of the box body with respect to the box body; and a slide portion configured to slide the lid body in the front and rear direction with respect to the base member.

According to the above-described configuration, each of the left and right lid bodies is slidable with respect to a different base member and each base member is rotatable with respect to the box body. For this reason, the pair of left and right lid bodies is independently slidable and rotatable. Thus, the lid body can be rotated and slid with satisfactory operability.

Thus, according to the present invention, it is possible to provide the gate-fold-type lid attached storage device of which the lid body is operated satisfactorily.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Figure 1:
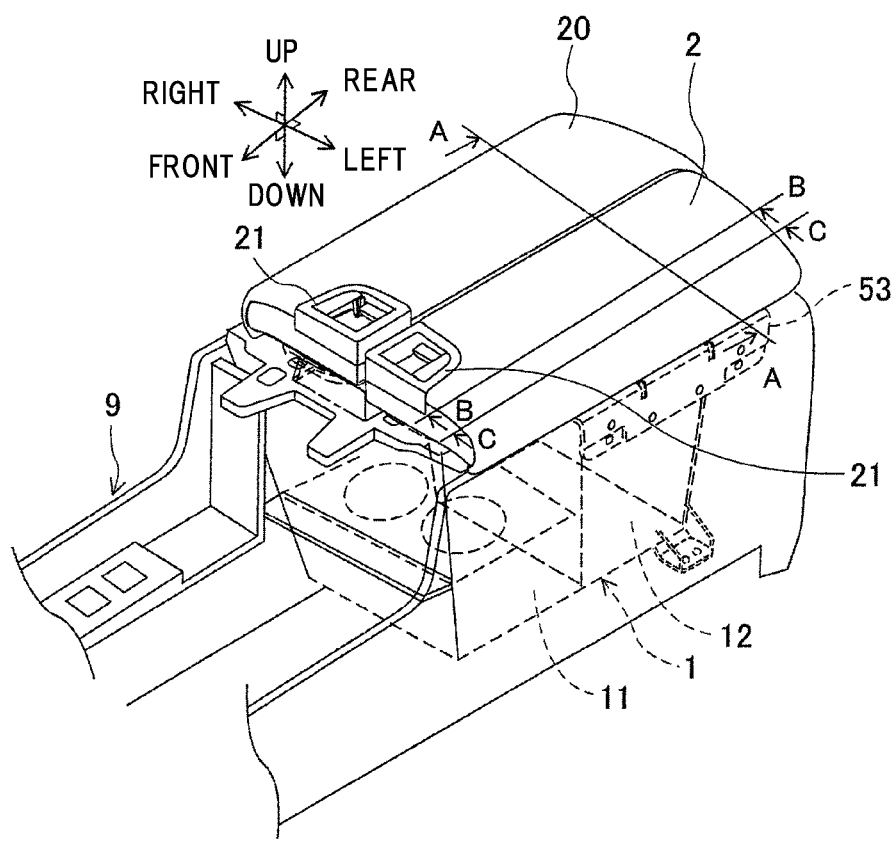
FIG. 1 is a perspective view illustrating a lid attached storage device that is provided in a center console according to an embodiment of the present invention.

A lid attached storage device according to an embodiment of the present invention will be described in detail with reference to the drawings. As illustrated in FIG. 1, the lid attached storage device is provided in a center console 9 disposed in the middle of front-row seats of an automobile. In FIG. 1 and the like, the up direction, the down direction, the right direction, the left direction, the front direction, and the rear direction are set when viewed from a passenger sitting on a driver seat.

Figure 2:
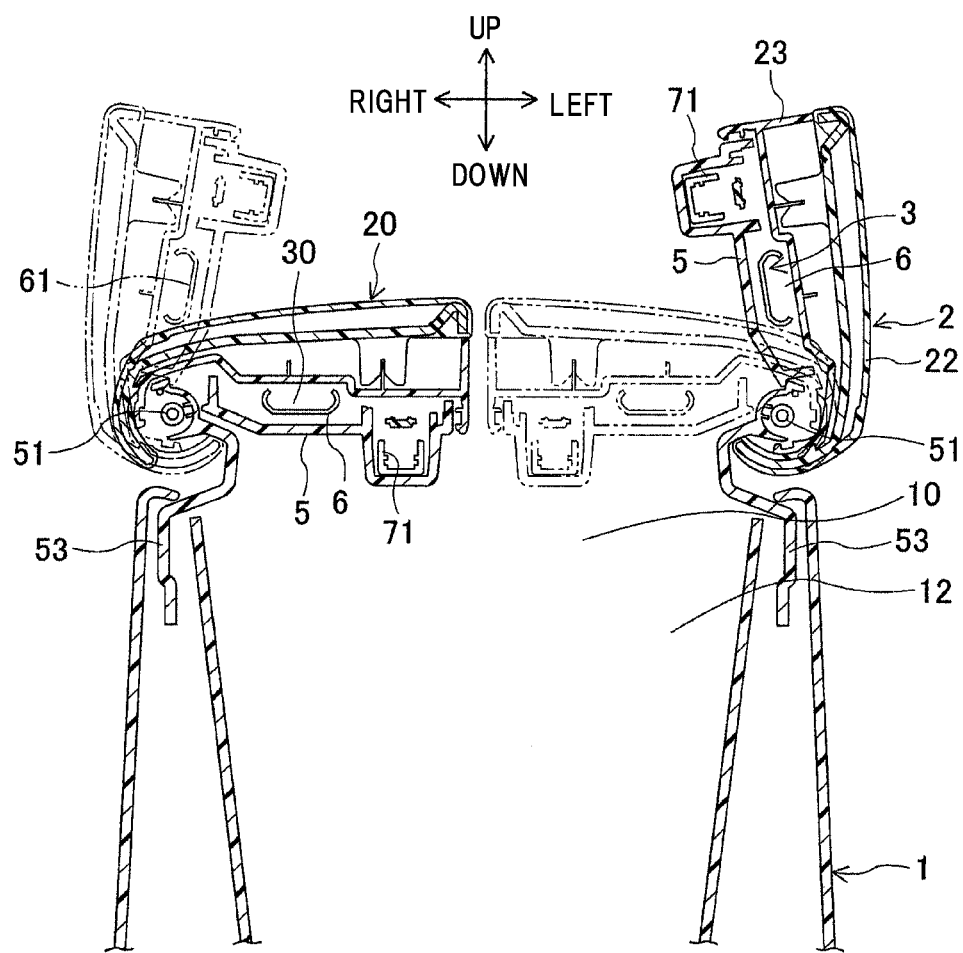
FIG. 2 is a cross-sectional view taken along an arrow A-A of FIG. 1.

As illustrated in FIGS. 1 and 2, the lid attached storage device includes a box body 1, a pair of left and right lid bodies 2 and 20, and a pair of left and right opening and closing mechanisms 3 and 30. The lid body 2 is a left lid body and the lid body 20 is a right lid body. The opening and closing mechanism 3 is used to open and close the left lid body 2 and the opening and closing mechanism 30 is used to open and close the right lid body 20.

Figure 3:
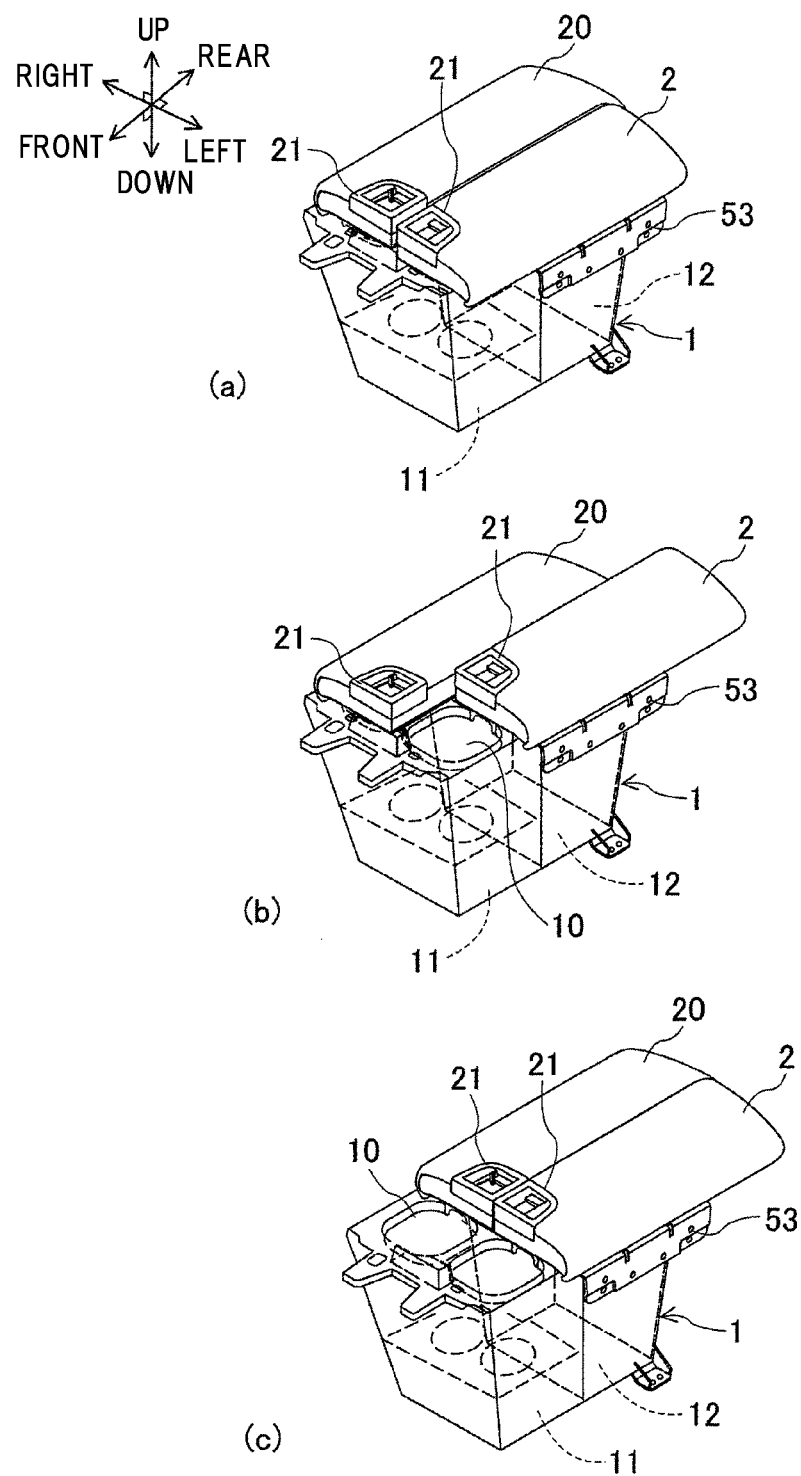
FIG. 3 is a perspective view illustrating the lid attached storage device according to the embodiment, Section (a) of FIG. 3 is corresponding to a state where a pair of left and right lid bodies is located at a front position, Section (b) of FIG. 3 is corresponding to a state where the left lid body is located at a rear position and a right lid is located at a front position, and Section (c) of FIG. 3 is corresponding to a state where the pair of left and right lid bodies is located at a rear position.

As illustrated in FIGS. 2 and 3, the pair of left and right lid bodies 2 and 20 covers both left and right sides of the box body 1. The opening and closing mechanisms 3 and 30 are used to independently slide and rotate the pair of left and right lid bodies 2 and 20.

Figure 4:
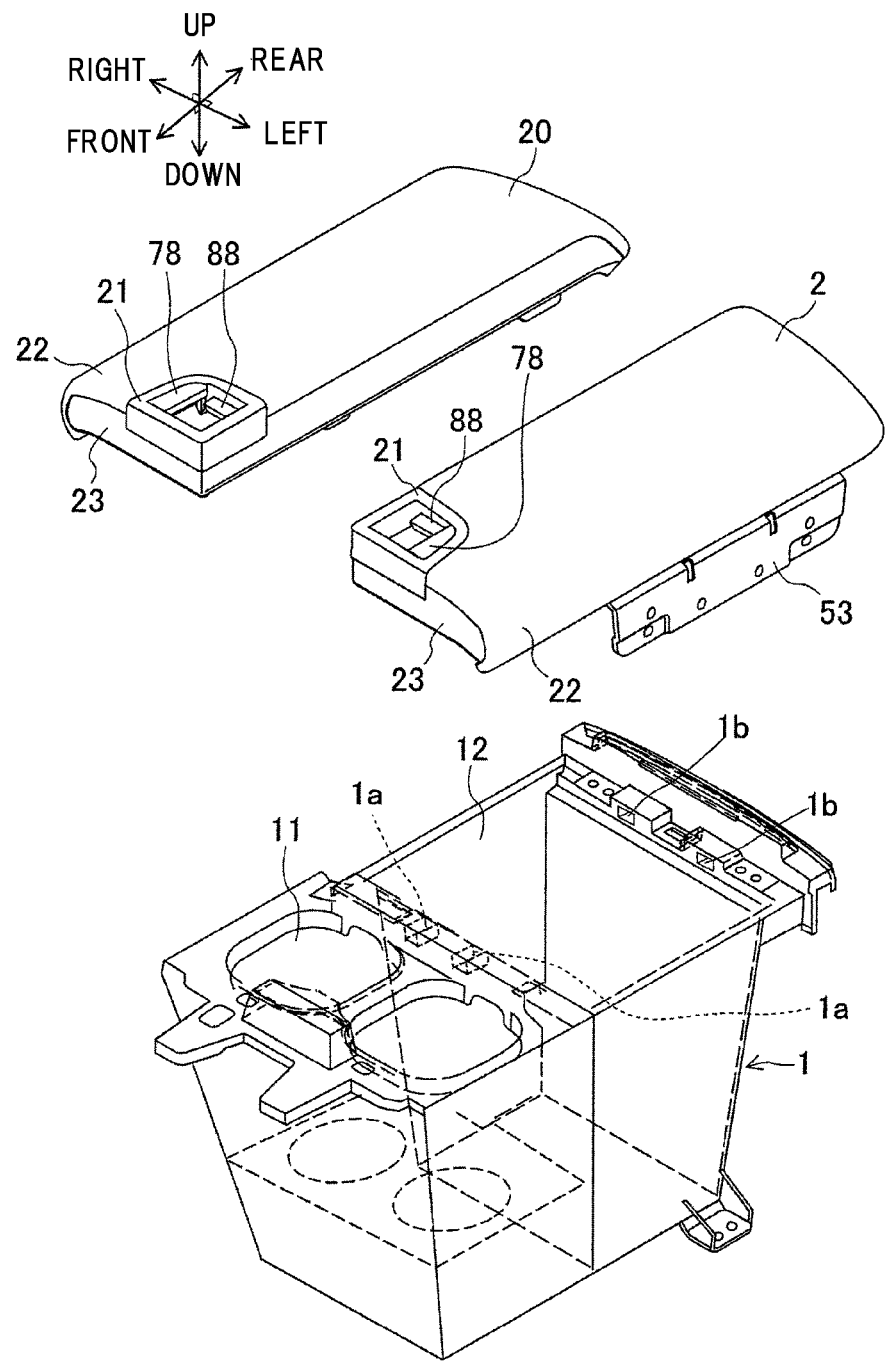
FIG. 4 is an exploded perspective view illustrating the lid attached storage device of this embodiment.

As illustrated in FIG. 4, the box body 1 includes a cup holder storage opening 11 disposed at a front side and a small article storage opening 12 disposed at a rear side.

The lid bodies 2 and 20 are respectively provided at both left and right sides of the box body 1. The left lid body 2 and the right lid body 20 are used to cover the left and right sides of the cup holder storage opening 11 and the small article storage opening 12 in an openable and closable manner. Since the pair of left and right lid bodies 2 and 20 has a bilateral symmetric structure, the left lid body 2 will be representatively described.

Figure 5:
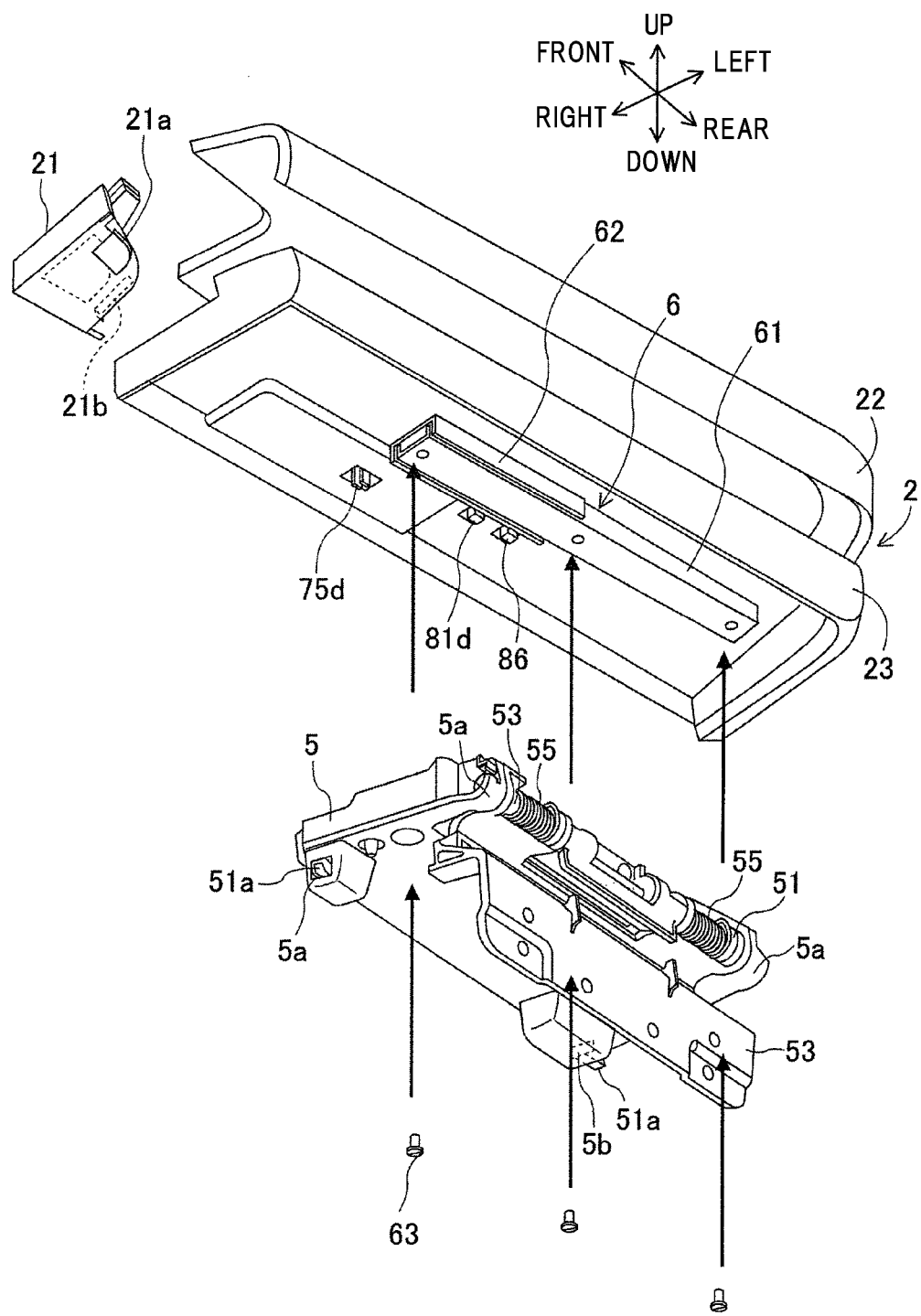
FIG. 5 is an exploded perspective view illustrating the lid body of this embodiment.

The front portion of the left lid body 2 is provided with an operation and holding frame 21. As illustrated in FIG. 5, the lid body 2 includes an upper member 22 and a lower member 23. The upper member 22 and the lower member 23 are integrated while being fitted to each other at the peripheral edges thereof, thereby constituting the lid body 2.

Figure 6:
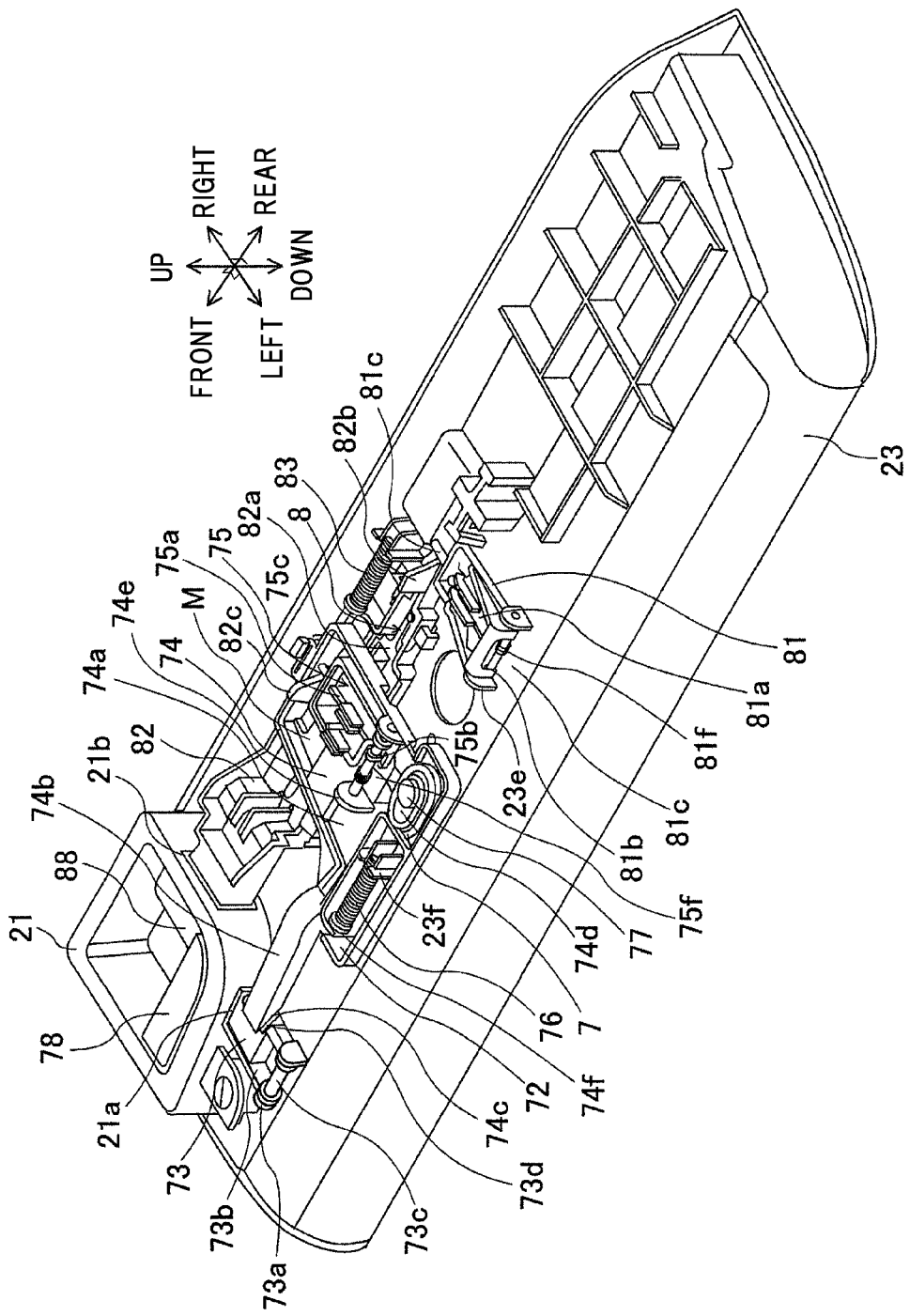
FIG. 6 is a perspective view illustrating a lower member of the lid member provided with a rotation locking mechanism and a slide locking mechanism of this embodiment.

As illustrated in FIG. 6, the operation and holding frame 21 is fixed to the front portion of the lower member 23. A first holding hole 21a is opened at an outer wall of the operation and holding frame 21 in the left and right direction and a second holding hole 21b is opened at a rear wall of the operation and holding frame 21.

As illustrated in FIG. 2, the opening and closing mechanisms 3 and 30 are respectively provided in the pair of left and right lid bodies 2 and 20. Since the pair of left and right opening and closing mechanisms 3 and 30 have a bilateral symmetrical structure in the left and right direction, the left opening and closing mechanism 3 will be representatively described.

As illustrated in FIGS. 5 and 6, the opening and closing mechanism 3 includes a base member 5, a rotational support portion 51, a slide portion 6, a rotation locking mechanism 7, and a slide locking mechanism 8. The base member 5 is provided between the box body 1 and the lid body 2. The base member 5 is formed in a rectangular thin sheet shape.

Figure 7:
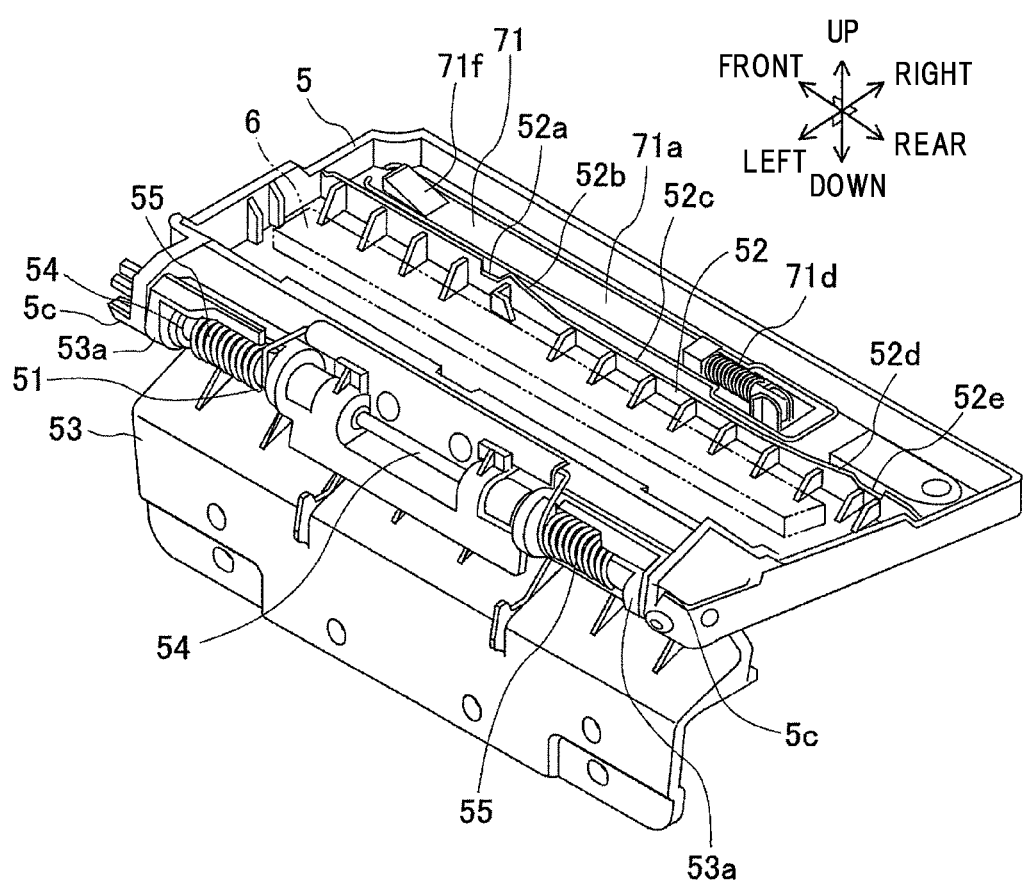
FIG. 7 is a perspective view illustrating a base member of this embodiment.
Figure 8:
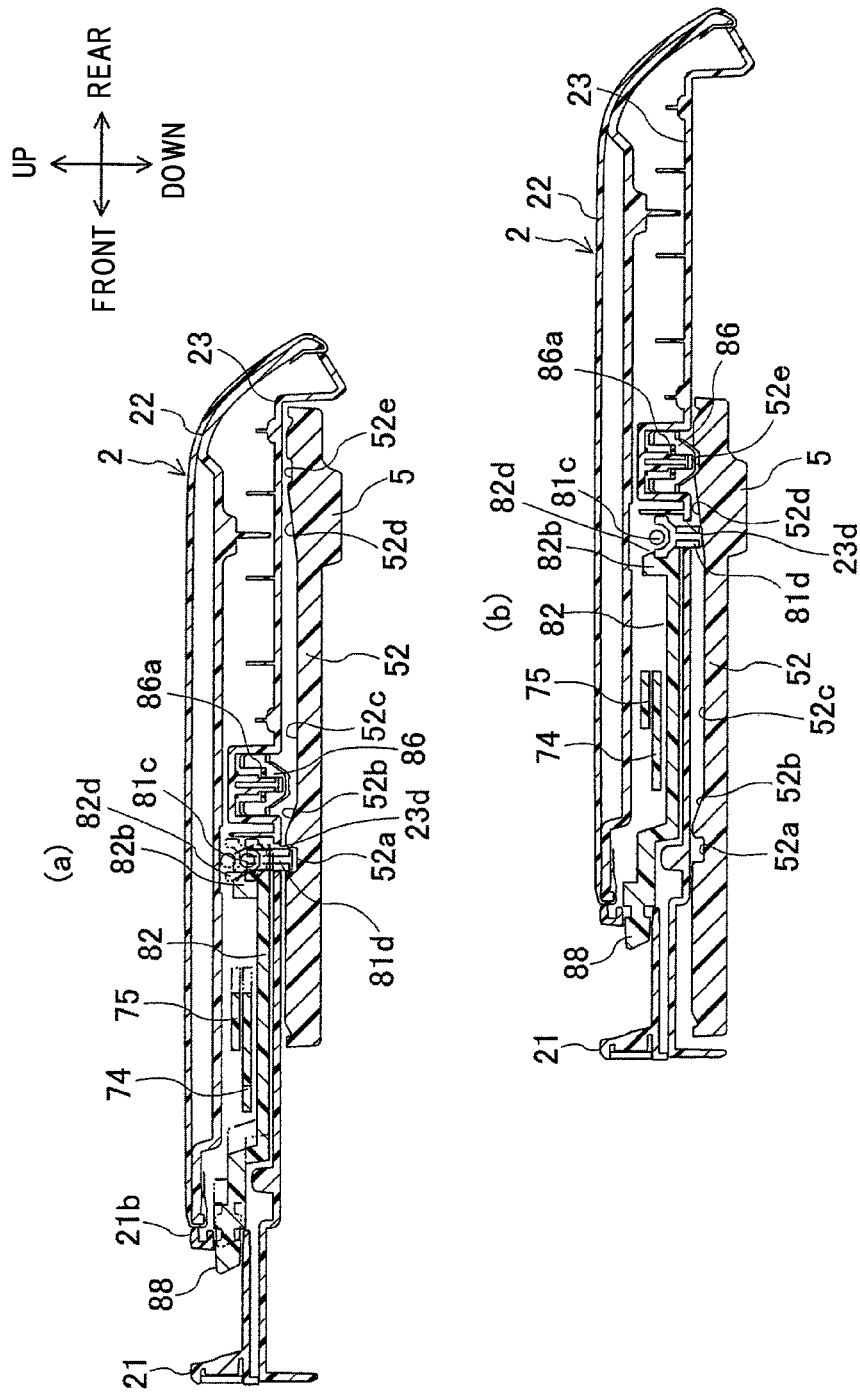
FIG. 8 is a cross-sectional view taken along an arrow B-B of FIG. 1, Section (a) of FIG. 8 is corresponding to a state in which the lid body is located at a front position, and Section (b) of FIG. 8 is corresponding to a state in which the lid body is located at a rear position.

As illustrated in FIGS. 7 and 8, the base member 5 includes a support wall 52 extending in the front and rear direction. In the base member 5, a slide portion 6 to be described later is disposed at the left side of the support wall 52 and a rotation locking portion 71 is disposed at the right side of the support wall 52.

A front engagement groove 52a is provided at a front side of the support wall 52 and a rear engagement groove 52e which is shallower than the front engagement groove 52a is provided at a rear end of the support wall 52. The front engagement groove 52a is used to lock the lid body 2 at a front position corresponding to a frontmost position. The rear engagement groove 52e is used to lock the lid body 2 at a rear position corresponding to a rearmost position.

A front inclined surface portion 52B which descends backward, a bottom portion 52c which extends horizontally backward substantially at the same height as the bottom surface of the front engagement groove 52a, and a rear inclined surface portion 52d which ascends backward from the bottom portion 52c are provided at a rear side of the front engagement groove 52a.

As illustrated in FIG. 7, an attachment member 53 is attached to a left peripheral edge of the base member 5. The attachment member 53 is fixed to a side wall of the box body 1 by threading. The rotational support portion 51 is provided between the base member 5 and the attachment member 53. In the rotational support portion 51, shaft holes are respectively coaxially provided in an axial support portion 5c protruding from a left side of the base member 5 and an axial support portion 53a protruding from an upper portion of the attachment member 53. When a shaft member 54 is inserted through these shaft holes, the base member 5 is rotatable with respect to the attachment member 53.

A rotational biasing member 55 is wound on the shaft member 54. The rotational biasing member 55 is a twist coil spring. When one end of the rotational biasing member 55 is locked to the base member 5 and the other end thereof is locked to the attachment member 53, the rotational biasing member 55 biases the base member 5 with respect to the attachment member 53 in the upward opening direction.

As illustrated in FIGS. 5 and 7, the slide portion 6 is provided between the base member 5 and the lid body 2. The slide portion 6 includes a guide portion 61 which is provided at the center of the base member 5 in the left and right direction and a rail portion 62 which is fixed to a lower surface of the lower member 23 of the lid body 2. The guide portion 61 is fixed to a lower surface of the base member 5 by a screw 63. The rail portion 62 is formed as an elongated body and is disposed in the lower member 23 in the front and rear direction. The rail portion 62 is fixed to the lower surface of the lower member 23 of the lid body 2 by a screw (not illustrated). The rail portion 62 engages with the guide portion 61 so as to be slidable in the front and rear direction. When the guide portion 61 slides the rail portion 62 in the front and rear direction, the lid body 2 moves between a front position located at the front side of the vehicle and a rear position located at the rear side of the vehicle.

Figure 9:
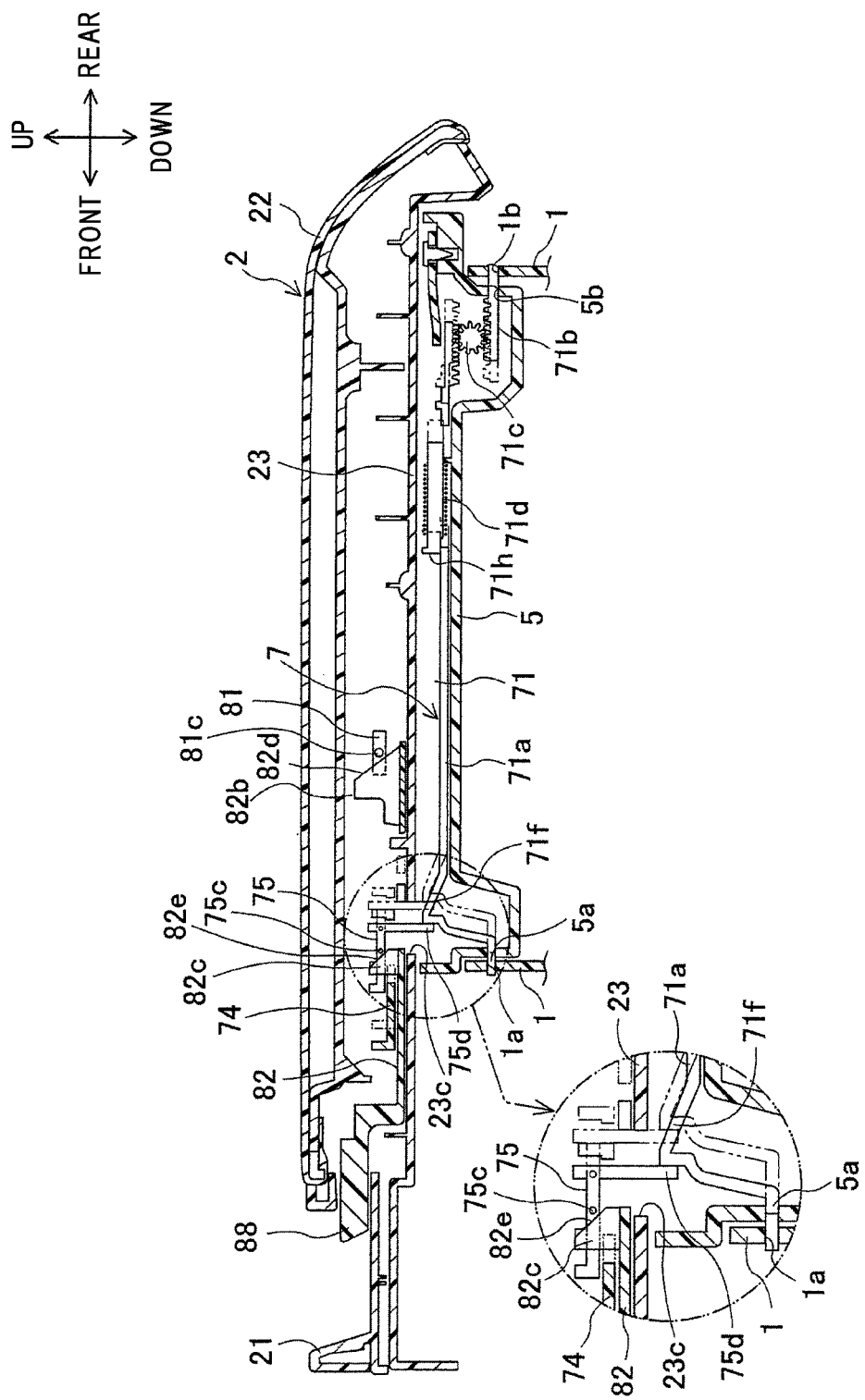
FIG. 9 is a cross-sectional view taken along an arrow C-C of FIG. 1 when a rotational operation portion is operated in a state where the lid body is located at a front position.
Figure 12:
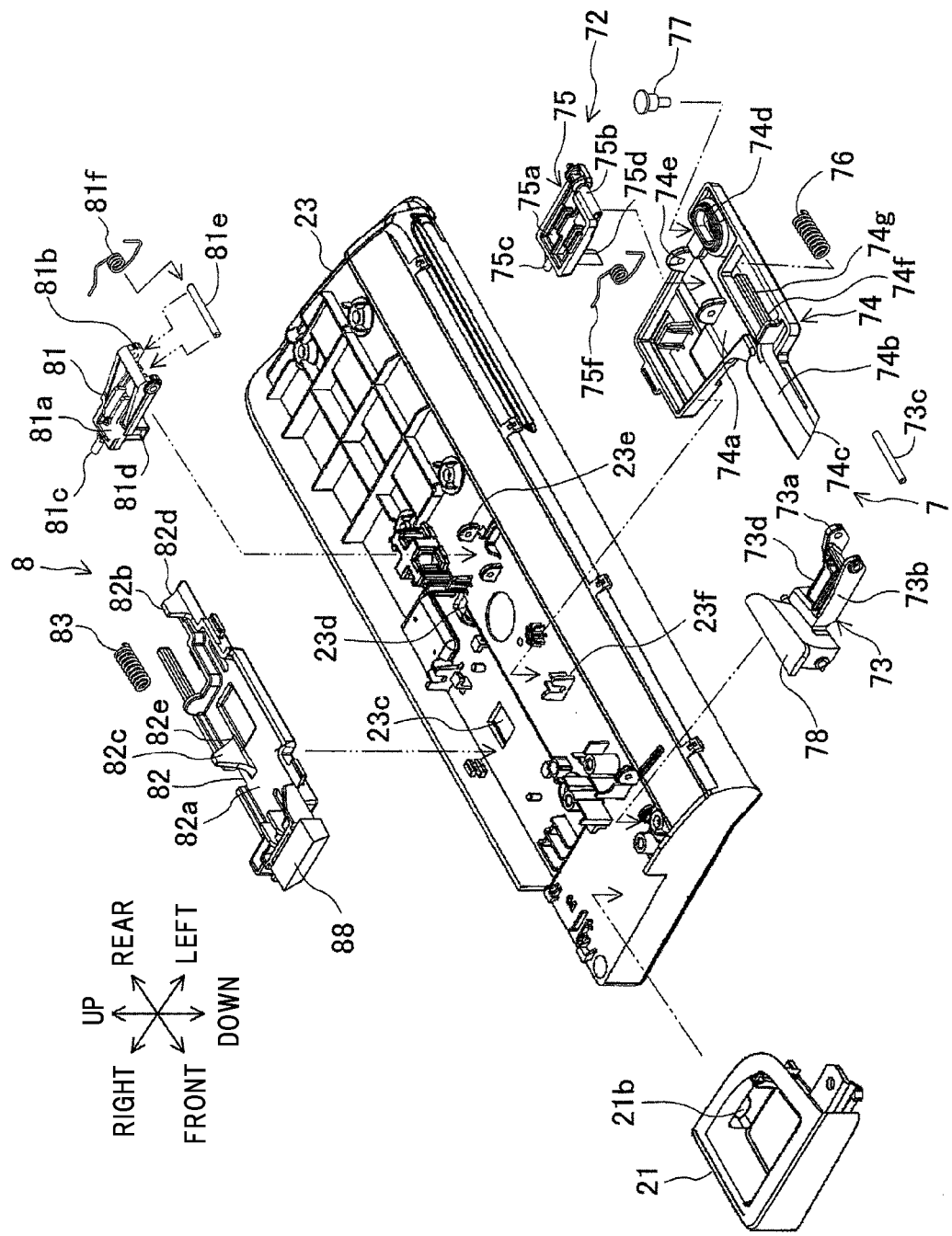
FIG. 12 is an exploded perspective view illustrating the rotation locking mechanism and the slide locking mechanism provided in the lower member of the lid body of this embodiment.

As illustrated in FIGS. 7, 9, and 12, the rotation locking mechanism 7 is used to lock the rotation of the base member 5 with respect to the box body 1 in a closed state where the base member 5 is located at a lowermost position and is used to release the rotation locking state of the base member 5. The rotation locking mechanism 7 includes a rotation locking portion 71, a rotational operation portion 78, and a rotation transmission portion 72. The rotation locking portion 71 is used to lock the rotation of the base member 5 with respect to the box body 1.

As illustrated in FIG. 9, the rotation locking portion 71 is provided in the base member 5. The rotation locking portion 71 includes a front rod 71a, a rear rod 71b, and a rotation gear 71c provided between the front rod 71a and the rear rod 71b.

A front end of the front rod 71a protrudes from a hole 5a of the base member 5 so as to be movable forward and backward and engages with a front engagement hole 1a provided in a front wall of the box body 1. The front rod 71a is provided with the rod biasing member 71d. The rod biasing member 71d is a compressive coil spring and is used to bias the front rod 71a in a direction in which the front end engages with the front engagement hole 1a of the box body 1. A bulged portion 71f which is inclined so as to increase in height as it goes forward is provided in the vicinity of the front end of the front rod 71a. An upright wall portion 71h is provided at a rear side of the bulged portion 71f of the front rod 71a.

A rear end of the rear rod 71b protrudes from a hole 5b of the base member 5 so as to be movable forward and backward and engages with a rear engagement hole 1b provided in a rear wall of the box body 1. A rack gear is provided in each of a rear end of the front rod 71a and a front end of the rear rod 71b and these rack gears engage with the rotation gear 71c. When the front rod 71a engages with the front engagement hole 1a and the rear rod 71b engages with the rear engagement hole 1b by the biasing force of the rod biasing member 71d, the rotation locking portion 71 locks the base member 5 in a closed state.

As illustrated in FIGS. 6 and 12, the rotational operation portion 78 is used to release the locking operation of the rotation locking portion 71. The rotational operation portion 78 is inserted into the first holding hole 21a of the operation and holding frame 21 and the leading end thereof is disposed at a left side inside the operation and holding frame 21.

The rotation transmission portion 72 is provided between the rotational operation portion 78 and the rotation locking portion 71 and is used to transmit an operation of the rotational operation portion 78 to the rotation locking portion 71. The rotation transmission portion 72 includes a first transmission member 73, a second transmission member 74, a third transmission member 75, a rotational biasing member 76, and a guide pin 77.

The first transmission member 73 includes a support portion 73a which is supported by the lower member 23 of the lid body 2 and an arm portion 73b which extends from the support portion 73a and swings about the support portion 73a. When a shaft 73c is inserted into a hole provided in the support portion 73a and both ends of the shaft 73c are rotatably supported by the lower member 23 of the lid body 2, the first transmission member 73 is supported so as to be rotatable with respect to the lower member 23 of the lid body 2. The rotational operation portion 78 is fixed to a leading end of the arm portion 73b.

The second transmission member 74 includes a thin sheet portion 74a which is formed in a substantially thin sheet shape and a rod 74b which protrudes toward a front end of the thin sheet portion 74a. A leading end of the rod 74b is provided with a tapered portion 74c and the tapered portion 74c comes into contact with a tapered portion 73d of the arm portion 73b of the first transmission member 73. The guide pin 77 is movably inserted into an elongated hole 74d provided in the second transmission member 74. The elongated hole 74d extends in the front and rear direction and causes the second transmission member 74 to be movable only in the front and rear direction.

The rotational biasing member 76 is disposed between the second transmission member 74 and the lower member 23 of the lid body 2. The rotational biasing member 76 is a compressive coil spring and the rotational biasing member 76 is inserted to the outside of a holding rod 74g of the second transmission member 74. When one end of the rotational biasing member 76 is locked to a base end 74f of the holding rod 74g and the other end thereof is locked to a holding portion 23f of the lower member 23, the second transmission member 74 is biased forward. Thus, the tapered portion 74c of the second transmission member 74 moves forward and upward with respect to the tapered portion 73d of the first transmission member 73 so that the arm portion 73b moves downward and the rotational operation portion 78 is located at a lower position.

The third transmission member 75 includes a thin sheet portion 75a, a rotational support portion 75b which is provided in one end of the thin sheet portion 75a, a guide portion 75c which is provided in the other end of the thin sheet portion 75a, and a protrusion portion 75d which protrudes toward the lower side of the thin sheet portion 75a. When both ends of the rotational support portion 75b are axially supported by a support portion 74e provided in the second transmission member 74, the third transmission member 75 is rotatable upward and downward about the rotational support portion 75b. The protrusion portion 75d protrudes downward from a communication hole 23c provided in the lower member 23 of the lid body 2 (FIG. 9). The third transmission member 75 is biased downward by an escape biasing member 75f.

Therefore, when the second transmission member 74 is biased forward by the rotational biasing member 76, the third transmission member 75 is also located at a front side (FIG. 9). The third transmission member 75 is located at a position where the biasing force of the rod biasing member 71d is not disturbed, that is, the third transmission member is located at a front side of the bulged portion 71f of the front rod 71a. For this reason, the front rod 71a and the rear rod 71b are used to keep the engagement with the front engagement hole 1a and the rear engagement hole 1b and to lock the rotation of the base member 5 in a closed state by the biasing force of the rod biasing member 71d.

As illustrated in FIGS. 6 and 9, when the rotational operation portion 78 is lifted upward, the first transmission member 73 swings upward and the second transmission member 74 moves backward against the biasing force of the rotational biasing member 76. In accordance with this movement, the third transmission member 75 also moves backward. The protrusion portion 75d of the third transmission member 75 pushes a front end surface of the bulged portion 71f of the front rod 71a backward so as to move the front rod 71a backward against the biasing force of the rod biasing member 71d. Thus, the front rod 71a is separated from the front engagement hole 1a. When the front rod 71a moves backward, the rotation gear 71c rotates, the rear rod 71b moves forward so as to be separated from the rear engagement hole 1b. In this way, when the rotational operation portion 78 is lifted upward, the rotation locking state of the base member 5 with respect to the box body 1 is released. When the rotation locking state of the base member 5 is released, the base member 5 rotates upward with respect to the box body 1 so as to become an maximal opened state by the biasing force of the rotational biasing member 55. Thus, as illustrated in FIG. 2, the lid body 2 is opened and the cup holder storage opening 11 and the small article storage opening 12 are opened at the left sides thereof. Even in the right opening and closing mechanism 30, when the rotational operation portion 78 is lifted upward, the right base member 5 rotates so as to open the lid body 20.

As illustrated in FIGS. 6, 8 and 12, the slide locking mechanism 8 is used to lock the slide movement of the lid body 2 in the front and rear direction with respect to the base member 5 at the frontmost position or the rearmost position and to release the slide locking state. The slide locking mechanism 8 includes a slide locking member 81, a slidable operation portion 88, a slide transmission member 82, and an engagement convex portion 86.

The slide locking member 81 is used to lock the lid body 2 at a front position with respect to the base member 5. The slide locking member 81 includes a thin sheet portion 81a, a rotational support hole 81b which is provided at one end of the thin sheet portion 81a, a guide portion 81c which is provided at the other end of the thin sheet portion 81a, and a protrusion portion 81d which protrudes toward the lower side of the thin sheet portion 81a. A shaft 81e is inserted into the rotational support hole 81b and both ends of the shaft 81e are axially supported by a support portion 23e provided in the lower member 23 of the lid body 2. The slide locking member 81 is rotatable upward and downward about the rotational support hole 81b.

As illustrated in Section (a) of FIG. 8, the protrusion portion 81d protrudes downward from a communication hole 23d provided in the lower member 23 of the lid body 2. As illustrated in FIG. 6, the shaft 81e is provided with a slide locking and biasing member 81f that biases the slide locking member 81 downward. When the lid body 2 is located at a front position with respect to the base member 5, the slide locking member 81 engages with the front engagement groove 52a of the base member 5 so as to lock the lid body 2 at the front position by the biasing force of the slide locking and biasing member 81f.

As illustrated in Section (b) of FIG. 8, the lower member 23 of the lid body 2 is provided with the engagement convex portion 86 which keeps the same position in the left and right direction at a rear side of the protrusion portion 81d of the slide locking member 81. The engagement convex portion 86 is used to lock the lid body 2 at a rear position with respect to the base member 5 or to release the locking state. The engagement convex portion 86 protrudes toward the lower side of the lower member 23 and is biased downward by a spring 86a. When the lid body 2 is located at a rear position with respect to the base member 5, the engagement convex portion 86 engages with the rear engagement groove 52e so as to lock the lid body 2 at the rear position.

When the lid body 2 is pushed forward, the spring 86a is compressed and the engagement convex portion 86 moves upward as indicated by a two-dotted chain line of Section (b) of FIG. 8. The engagement convex portion 86 climbs over an inclined side surface of the rear engagement groove 52e, moves downward along the rear inclined surface portion 52d, and moves the bottom portion 52c forward. The lid body 2 slides forward with respect to the base member 5.

As illustrated in FIG. 6 and Section (a) of FIG. 8, the slidable operation portion 88 is used to release the locking operation of the slide locking member 81. The slidable operation portion 88 is provided in the operation and holding frame 21 provided in the lower member 23 of the lid body 2.

The slide transmission member 82 is provided between the slide locking member 81 and the slidable operation portion 88 and is used to transmit an operation of the slidable operation portion 88 to the slide locking member 81. The slide transmission member 82 includes an elongated thin sheet portion 82a which extends in the front and rear direction, a first protrusion portion 82b which protrudes upward from a rear portion of the thin sheet portion 82a, and a second protrusion portion 82c which protrudes upward from the substantial center of the thin sheet portion 82a in the front and rear direction. The slidable operation portion 88 is fixed to a front portion of the thin sheet portion 82a.

The slidable operation portion 88 is inserted into the second holding hole 21b of the operation and holding frame 21 and a leading end thereof is disposed at a rear side inside the operation and holding frame 21. A sliding and biasing member 83 is provided between the slide transmission member 82 and the lower member 23 of the lid body 2. By the sliding and biasing member 83, the slide transmission member 82 is biased forward so that the slidable operation portion 88 enters the operation and holding frame 21.

Figure 13:
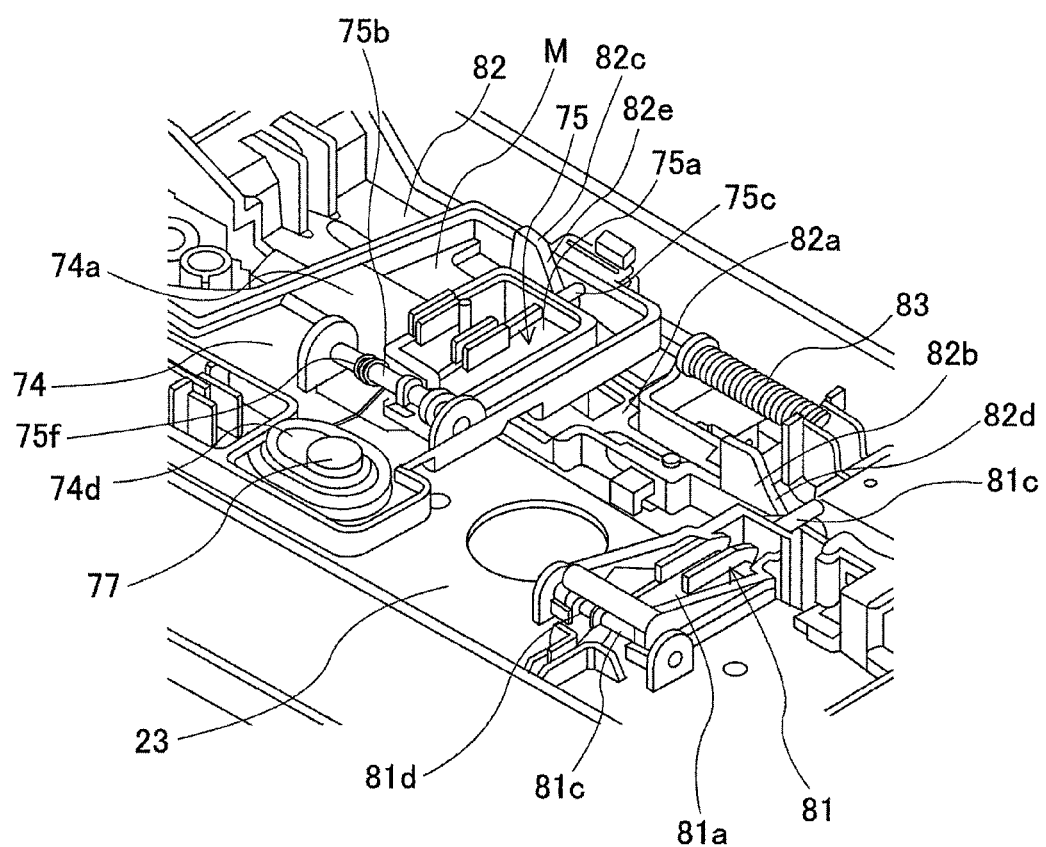
FIG. 13 is an enlarged perspective view illustrating a slide transmission portion and a rotation transmission portion of this embodiment.
Figure 14:
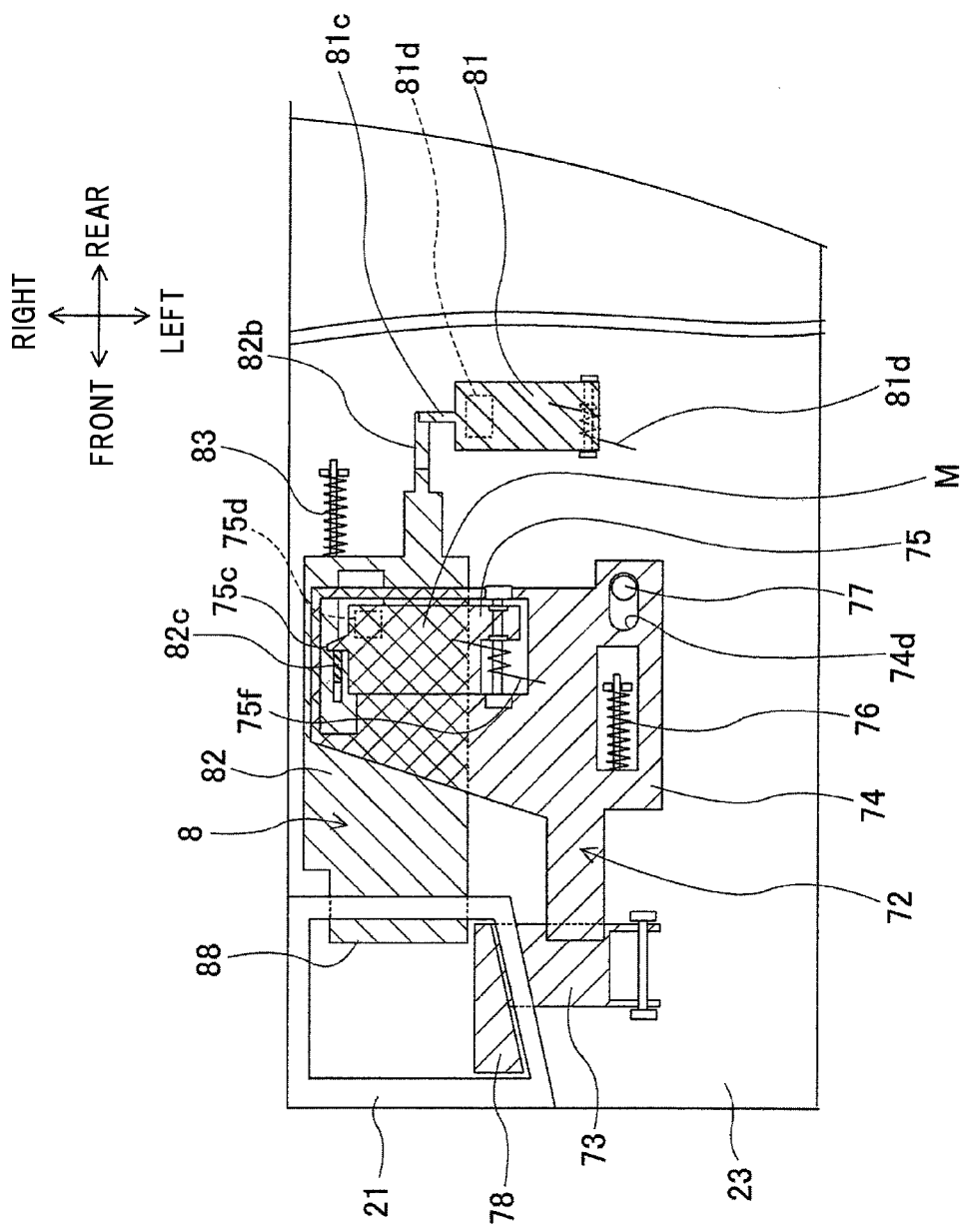
FIG. 14 is a top view illustrating the rotation locking mechanism and the slide locking mechanism provided in the lower member of the lid body of this embodiment.

Therefore, as illustrated in FIG. 13, the slide transmission member 82 of the slide locking mechanism 8 and the second transmission member 74 and the third transmission member 75 of the rotation locking mechanism 7 have an overlapping region M in which these members overlap one another in the up and down direction. In FIG. 14, the slide transmission member 82 is depicted by a right upward hatching, the first transmission member 73, the second transmission member 74, and the third transmission member 75 of the rotation locking mechanism 7 are depicted by a right downward hatching, and the overlapping region M is depicted by a cross hatching. The overlapping region M is located at a right side of the second transmission member 74 and the third transmission member 75 of the rotation transmission portion 72. The overlapping region M is located at the substantial center of the slide transmission member 82 in the front and rear direction. The second protrusion portion 82c of the slide transmission member 82 is located at the overlapping region M and the first protrusion portion 82b is located at the other portion except for the overlapping region M.

As illustrated in FIG. 13, a rear surface of the first protrusion portion 82b and a rear surface of the second protrusion portion 82c are respectively provided with inclined portions 82d and 82e which are inclined forward in the up direction. The inclined portion 82d of the first protrusion portion 82b faces the guide portion 81c of the slide locking member 81 at a close position. The inclined portion 82e of the second protrusion portion 82c faces the guide portion 75c of the third transmission member 75 of the rotation locking mechanism 7 at a close position.

Figure 10:
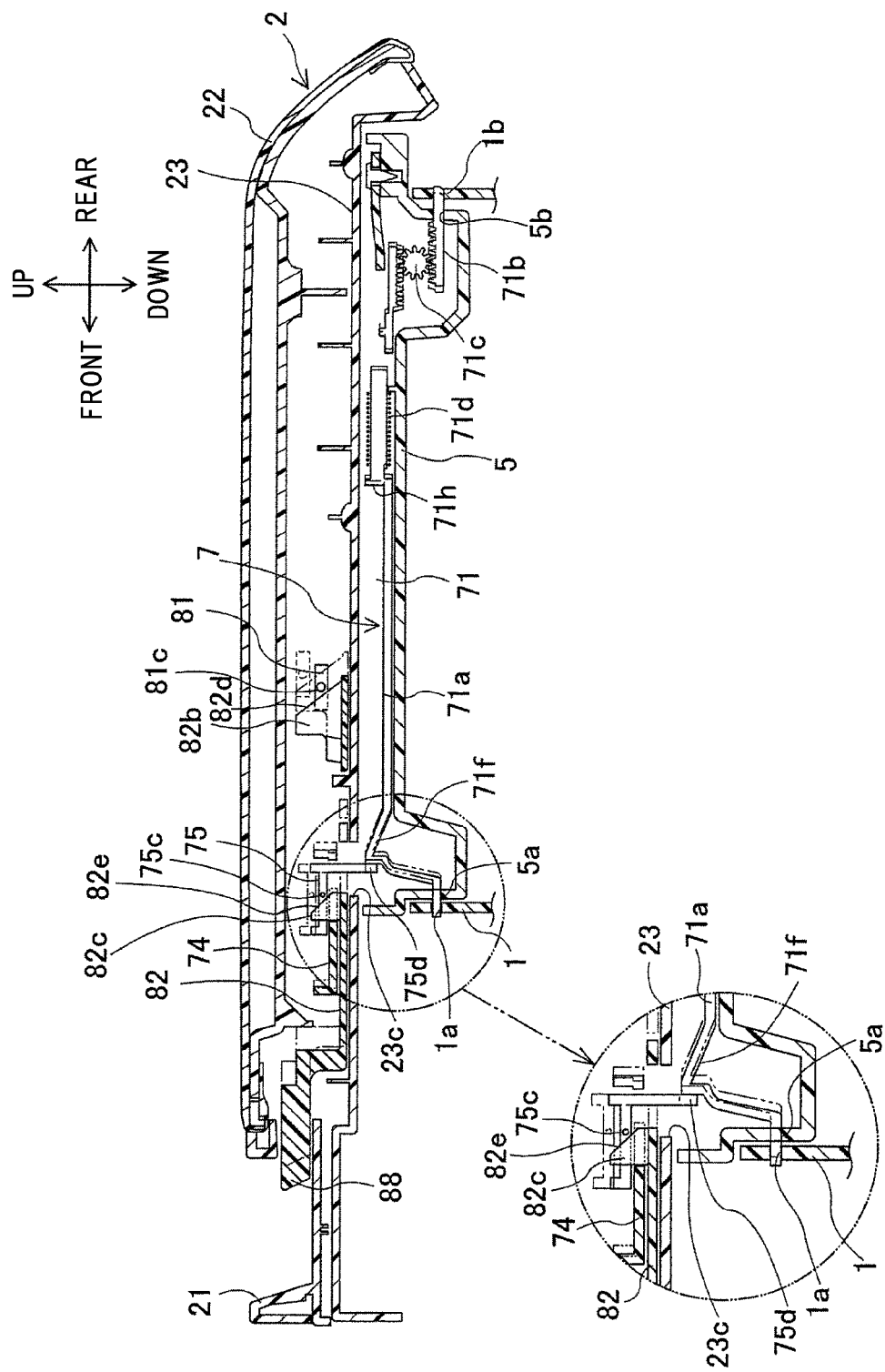
FIG. 10 is a cross-sectional view taken along the arrow C-C of FIG. 1 when a slidable operation portion is operated in a state where the lid body is located at a front position.

As illustrated in Section (a) of FIG. 8 and FIG. 10, when the slidable operation portion 88 is not operated, the slide transmission member 82 is located at a front position by the sliding and biasing member 83. At this time, the guide portion 81c of the slide locking member 81 is located at an upper and rear side of the inclined portion 82d of the first protrusion portion 82b and the protrusion portion 81d of the slide locking member 81 is locked to the front engagement groove 52a of the support wall 52 of the base member 5 so as to lock the lid body 2 at a front position with respect to the base member 5. The guide portion 75c of the third transmission member 75 is located at an upper and rear side of the inclined portion 82e of the second protrusion portion 82c.

When the slidable operation portion 88 is pushed backward as depicted by a two-dotted chain line of FIG. 10, the slide transmission member 82 is retracted backward against the biasing force of the sliding and biasing member 83. The inclined portion 82d of the first protrusion portion 82b comes into contact with the guide portion 81c of the slide locking member 81. Thus, the guide portion 81c is guided by the inclined portion 82d of the first protrusion portion 82b so as to swing upward. The protrusion portion 81d of the slide locking member 81 moves upward. As depicted by a two-dotted chain line of Section (a) of FIG. 8, the protrusion portion 81d is separated from the front engagement groove 52a of the support wall 52 of the base member 5 and hence the slide locking state of the lid body 2 at the front position is released.

Therefore, as illustrated in FIG. 10, if only the protrusion portion 81d of the slide locking member 81 is separated from the front engagement groove 52a of the base member 5, the lid body 2 slides backward with respect to the base member 5 and the base member 5 rotates upward when the lid body 2 is pushed backward. The reason is as below. Somce the lid body 2 is provided with the rotation transmission portion 72, the bulged portion 71f of the front rod 71a of the rotation locking portion 71 is located at a rear side of the protrusion portion 75d of the third transmission member 75 of the rotation transmission portion 72, that is, a rear side as the movement direction of the lid body 2. When the lid body 2 is slid backward, the protrusion portion 75d interferes with the bulged portion 71f and the front rod 71a and the rear rod 71b of the rotation locking portion 71 are retracted and separated from the front engagement hole 1a and the rear engagement hole 1b so that the rotation locking state is released.

Therefore, in this embodiment, as illustrated in FIG. 10, the second protrusion portion 82c of the slide transmission member 82 serves as an avoiding component which avoids the interference between the slide transmission member 82 and the rotation transmission portion 72. Specifically, when the slidable operation portion 88 is pushed so as to retract the slide transmission member 82 backward, the inclined portion 82e of the second protrusion portion 82c comes into contact with the guide portion 75c of the third transmission member 75 of the rotation locking mechanism 7. Thus, the guide portion 75c is guided by the inclined portion 82e so as to swing upward. The protrusion portion 75d of the third transmission member 75 moves upward to a position higher than the bulged portion 71f provided in the front rod 71a of the rotation locking portion 71. In this state, the lid body 2 is pushed backward so as to be slid backward. Then, the protrusion portion 75d of the third transmission member 75 climbs over the bulged portion 71f and moves toward a rear side of the bulged portion 71f. The front rod 71a and the rear rod 71b of the rotation locking portion 71 are used to keep the engagement with the front engagement hole 1a and the rear engagement hole 1b and to keep the base member 5 in a closed stat. In this way, the second protrusion portion 82c of the slide transmission member 82 is used to avoid the interference between the slide transmission member 82 and the rotation transmission portion 72 at the overlapping region M. When the lid body 2 is pushed backward, the protrusion portion 81d reaches the bottom portion 52c through the front inclined portion 52b and slides backward while the front rod 71a and the rear rod 71b of the rotation locking portion 71 continuously engage with the front engagement hole 1a and the rear engagement hole 1b.

Here, the upward moving timing of the protrusion portion 81d of the slide locking member 81 of the slide locking mechanism 8 and the upward moving timing of the protrusion portion 75d of the third transmission member 75 of the rotation locking mechanism 7 may be equal or slightly different from each other. It is desirable that the upward moving timing of the protrusion portion 75d of the third transmission member 75 of the rotation locking mechanism 7 be slightly faster than the upward moving timing of the protrusion portion 81d of the slide locking member 81 of the slide locking mechanism 8. In this case, when the protrusion portion 75d of the third transmission member 75 moves upward at an early timing, the locking operation of the bulged portion 71f of the front rod 71a with respect to the protrusion portion 75d is released. Subsequently, the locking operation of the protrusion portion 81d with respect to the front engagement groove 52a is released. Accordingly, the lid body 2 is slidable. As a result, it is possible to reliably prevent a problem in which the lid body 2 rotates to be opened before the lid body 2 slides.

Figure 11:
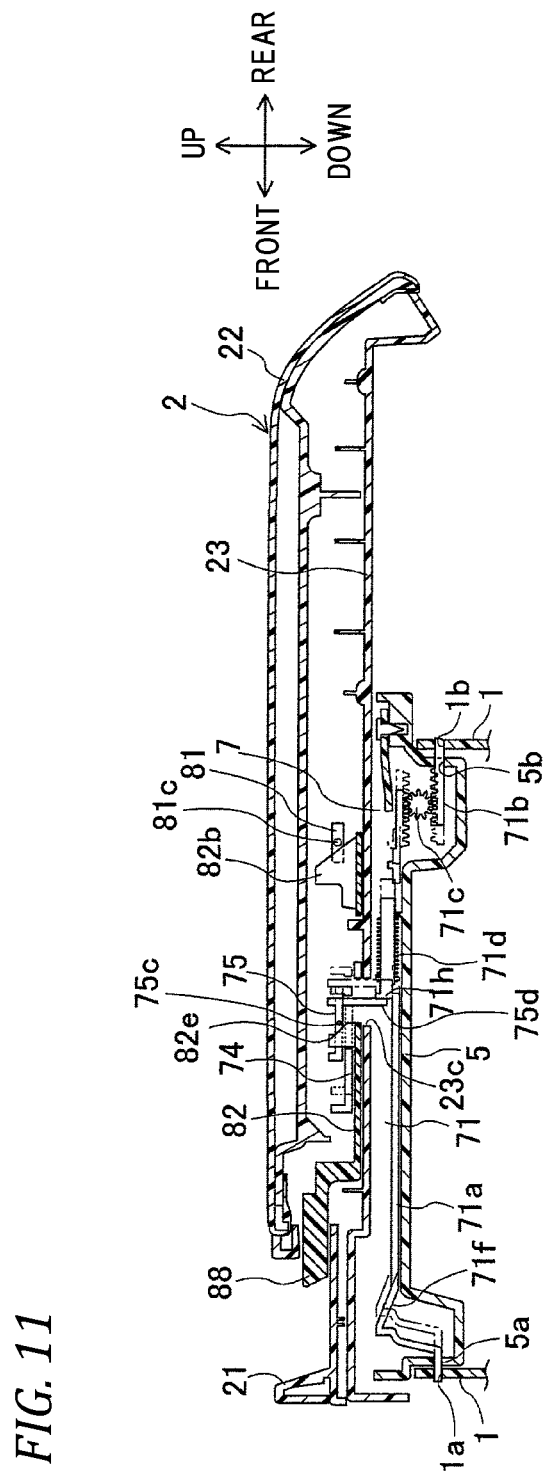
FIG. 11 is a cross-sectional view taken along the arrow C-C of FIG. 1 when the rotational operation portion is operated in a state where the lid body is located at a rear position.

As illustrated in Section (b) of FIG. 8, when the lid body 2 is further slid backward, the engagement convex portion 86 provided in the lower member 23 of the lid body 2 is locked to the rear engagement groove 52e of the support wall 52 of the base member 5 and the backward movement of the lid body 2 is locked. At this time, as illustrated in FIG. 11, the protrusion portion 75d of the third transmission member 75 is located directly before the upright wall portion 71h of the front rod 71a. For this reason, if the rotational operation portion 78 is operated when the lid body 2 is located at the rear position, the protrusion portion 75d pushes the upright wall portion 71h backward and hence the front rod 71a moves backward. The front rod 71a and the rear rod 71b are separated from the front engagement hole 1a and the rear engagement hole 1b so that the rotation locking state is released. In this way, in this embodiment, the rotation locking state of the base member 5 can be released when the lid body 2 is located at the front position and the rear position.

According to the lid attached storage device of the present invention, as illustrated in FIGS. 2 and 3, the pair of left and right lid bodies 2 and 20 is respectively independently slidable with respect to the base member 5 by the opening and closing mechanisms 3 and 30 and each base member 5 is rotatable with respect to the box body 1. For this reason, the pair of left and right lid bodies 2 and 20 is independently slidable and rotatable. Even when the lid bodies 2 and 20 are all located at the front position and the rear position in the front and rear direction, the lid bodies 2 and 20 can be rotated independently. Thus, the lid bodies 2 and 20 are rotated and slid with excellent operability.

The rotation locking mechanism 7 and the slide locking mechanism 8 are provided in each of the pair of left and right lid bodies 2 and 20. For this reason, it is possible to independently lock the rotation and the slide of the pair of left and right lid bodies 2 and 20 and to independently release the rotation locking state and the slide locking state.

When the rotational operation portion 78 in any one of the pair of left and right opening and closing mechanisms 3 and 30 is operated so as to release the rotation locking state of the base member 5, the slide locking states of the lid bodies 2 and 20 are kept without any influence on the slide locking mechanism 8. When the slidable operation portion 88 is operated so as to release the slide of each of the lid bodies 2 and 20, the lid body 2 can be slid in the front and rear direction with respect to the base member 5 while the rotation locking state is kept in the closed state of the base member 5 using the rotation locking mechanism 7. Thus, the locking state of any one of the rotation locking mechanism 7 and the slide locking mechanism 8 can be independently released without any influence to the other thereof by the operation of the slidable operation portion 88 or the rotational operation portion 78. According to the pair of left and right opening and closing mechanisms 3 and 30, the lid bodies 2 and 20 can be slid in the front and rear direction regardless of the state where the lid bodies 2 and 20 are opened and closed.

The rotational operation portion 78 and the slidable operation portion 88 are disposed at a portion close to an operator in the front and rear direction of the lid body 2. The rotational operation portion 78 is adapted to be operated toward the rotational support portion 51 of the lid body 2 and the slidable operation portion 88 is adapted to be operated toward the center portion of the lid body 2 in the front and rear direction. For this reason, the rotational operation portion 78 and the slidable operation portion 88 are disposed in a direction in which the operation portions are easily operated by the operator and the rotational operation portion 78 and the slidable operation portion 88 have satisfactory operability.

According to the above-described embodiment, the pair of left and right lid bodies 2 and 20 respectively includes the opening and closing mechanisms 3 and 30 having the same configuration. However, when the pair of left and right lid bodies 2 and 20 is independently slidable and rotatable in the up and down direction, the opening and closing mechanisms 3 and 30 having a different configuration may be provided.

In the above-described embodiment, the second protrusion portion 82c as the avoiding component is provided in the slide transmission member 82 of the slide locking mechanism 8 so as to avoid the interference between the slide transmission member 82 and the rotation transmission portion 72. However, the avoiding component may be provided in the rotation transmission portion 72 of the rotation locking mechanism 7 so as to avoid the interference between the rotation transmission portion 72 and the slide transmission member 82.

Figure 15:
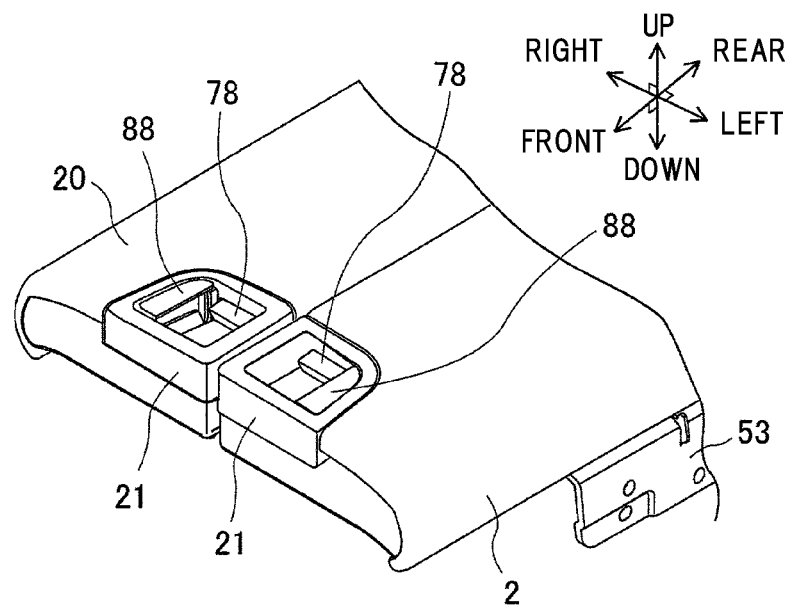
FIG. 15 is a perspective view illustrating a lid body as a modified example of the embodiment of the present invention in a state where a rotational operation portion is disposed at a rear side of an operation and holding frame and a slidable operation portion is disposed at an outside inside the operation and holding frame in the left and right direction.
Figure 16:
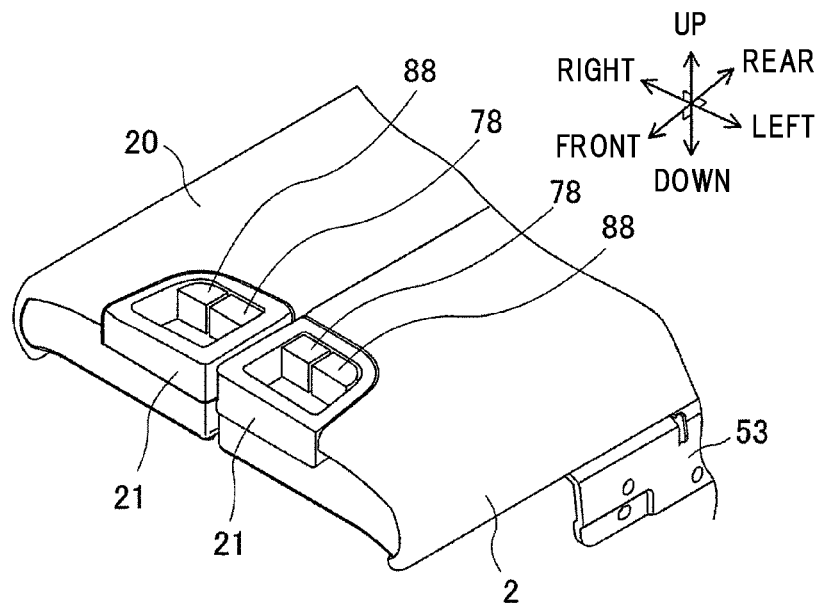
FIG. 16 is a perspective view illustrating a lid body as a modified example of the embodiment of the present invention in a state where a rotational operation portion and a slidable operation portion are all disposed in parallel at a rear side inside an operation and holding frame.

In the above-described embodiment, the rotational operation portion 78 is disposed at the outside inside the operation and holding frame 21 in the left and right direction and the slidable operation portion 88 is disposed at the rear side inside the operation and holding frame 21. However, the operation portions may be disposed at any position inside the operation and holding frame 21. For example, as illustrated in FIG. 15, the rotational operation portion 78 may be disposed at the rear side of the operation and holding frame 21 and the slidable operation portion 88 may be disposed at the outside of the operation and holding frame 21 in the left and right direction. Alternatively, as illustrated in FIG. 16, the rotational operation portion 78 and the slidable operation portion 88 both may be disposed in parallel at the rear side inside the operation and holding frame 21.

In this embodiment, as illustrated in FIG. 6, the rotational operation portion 78 is of a knob type in which the rotational operation portion is lifted upward and the slidable operation portion 88 is of a button type in which the rotational operation portion is pushed backward. However, the rotational operation portion 78 may be of a button type and the slidable operation portion 88 may be of a knob type.

In the above-described embodiment, the rotation transmission portion 72 includes three components, that is, the first transmission member 73, the second transmission member 74, and the third transmission member 75, but may include only one or two members. The rotation transmission portion 72 may be integrated with the rotation locking portion 71. The rotation transmission portion 72 may be separated from the rotational operation portion 78.

In this embodiment, each of the slide locking member 81 and the slide transmission member 82 is formed as one member, but may be formed as two or three members. The slide transmission member 82 may be separated from the slidable operation portion 88 and may be integrated with the slide locking member 81.

In this embodiment, as illustrated in FIG. 3, the lid bodies 2 and 20 are slid in the front and rear direction when the operator pushes the lid bodies. However, the lid body located at the front position or the rear position may be automatically moved forward or backward by the use of a biasing member such as a constant spring.

In this embodiment, as illustrated in FIG. 8, the lid bodies 2 and 20 are locked at the front position when the slide locking member 81 is locked to the front engagement groove 52a and the lid bodies 2 and 20 are locked at the rear position when the engagement convex portion 86 is locked to the rear engagement groove 52e. However, the lid bodies 2 and 20 may be locked at the front position and the rear position at the same time when the slide locking member 81 is locked to the front engagement groove 52a and the rear engagement groove 52e.

The lid attached storage device of this embodiment is provided in the center console 9 of the front-row seats as illustrated in FIG. 1, but may be provided at a center console of a rear seat.

(1) The lid attached storage device of this embodiment is a lid attached storage device including the box body 1 that includes the opening (the cup holder storage opening 11 and the small article storage opening 12), the pair of left and right lid bodies 2 and 20 that covers the left and right sides of the opening, and the pair of left and right opening and closing mechanisms 3 and 30 that causes the pair of left and right lid bodies 2 and 20 to be slidable in the front and rear direction and rotatable in the up and down direction with respect to the box body 1. Here, each of the pair of left and right opening and closing mechanisms 3 and 30 includes the base member 5 that is provided between the box body 1 and each of the lid bodies 2 and 20, the rotational support portion 51 that supports the base member 5 so as to be rotatable in the up and down direction about the left or the right sides of the box body 1 with respect to the box body 1, and the slide portion 6 that slides the lid bodies 2 and 20 in the front and rear direction with respect to the base member 5.

According to the above-described configuration, each of the pair of left and right lid bodies 2 and 20 is independently slidable with respect to the base member 5 and each base member 5 is rotatable with respect to the box body 1. For this reason, the pair of left and right lid bodies 2 and 20 is independently slidable and rotatable. Thus, the operability of the lid body 2 is excellent.

(2) Each of the opening and closing mechanisms 3 and 30 further includes a rotation locking mechanism 7 that locks the rotation of the base member 5 with respect to the box body 1 and releases the rotation locking state and the slide locking mechanism 8 that locks the slide of each of the lid bodies 2 and 20 with respect to the base member 5 and releases the slide locking state. Here, the rotation locking mechanism 7 and the slide locking mechanism 8 are provided in each of the pair of left and right lid bodies 2 and 20.

According to the above-described configuration, the rotation locking mechanism 7 and the slide locking mechanism 8 are provided in each of the pair of left and right lid bodies 2 and 20. For this reason, it is possible to independently lock the rotation and the slide of the pair of left and right lid bodies 2 and 20 and to independently release the rotation locking state and the slide locking state.

(3) The rotation locking mechanism 7 includes the rotation locking portion 71 that locks the rotation of the base member 5 with respect to the box body 1, the rotational operation portion 78 that releases the locking operation of the rotation locking portion 71, and the rotation transmission portion 72 that is provided between the rotation locking portion 71 and the rotational operation portion 78 and transmits the operation of the rotational operation portion 78 to the rotation locking portion 71. In addition, the slide locking mechanism 8 includes the slide locking portion (the slide locking member 81) that locks the slide of each of the lid bodies 2 and 20 with respect to the base member 5, the slidable operation portion 88 that releases the locking operation of the slide locking portion, and the slide transmission portion (the slide transmission member 82) that is provided between the slide locking portion and the slidable operation portion 88 and transmits the operation of the slidable operation portion 88 to the slide locking portion. Also, the slide transmission portion and the rotation transmission portion 72 have the overlapping region M therebetween and the slide transmission portion or/and the rotation transmission portion 72 include the avoiding component (the guide portion 75c of the third transmission member 75) that avoids the interference between any one of the slide transmission portion and the rotation transmission portion 72 and the other of the slide transmission portion and the rotation transmission portion 72 in the overlapping region M.

According to the above-described configuration, the slide transmission portion includes the avoiding component that avoids the interference between the operation of the slide transmission portion and the operation of the rotation transmission portion 72 in the overlapping region M. For this reason, the slidable operation portion 88 and the rotational operation portion 78 can be independently operated without any influence therebetween.

(4) The rotational operation portion 78 and the slidable operation portion 88 are disposed at a front portion of the lid body 2, the rotational operation portion 78 is adapted to be operated toward the rotational support portion 51 of the lid body 2, and the slidable operation portion 88 is adapted to be operated from the front portion of the lid body 2 toward the center portion thereof.

According to the above-described configuration, the rotational operation portion 78 and the slidable operation portion 88 are provided at the front portion of the lid body 2. The front portion of the lid body 2 indicates the front portion of the lid body 2 in the front and rear direction in relation to the center position thereof. For example, when the lid attached storage device is attached to the center console of the vehicle interior, the front portion of the lid body 2 is located at a position near passengers sitting on a driver seat and an assistant seat so that the lid body can be easily operated by the passengers. The rotational operation portion 78 and the slidable operation portion 88 are disposed in a direction in which these operations portions can be easily operated by an operator and hence the rotational operation portion 78 and the slidable operation portion 88 have satisfactory operability.

The meaning of the "rotational operation portion 78 is adapted to be operated toward the rotational support portion 51 of the lid body 2" indicates, for example, a case where the rotational operation portion 78 is operated from the current position of the rotational operation portion 78 toward the position of the rotational support portion 51 or the rotational operation portion 78 is operated in the up direction as the rotation direction. The meaning of the "slidable operation portion 88 is adapted to be operated from the front portion of the lid body 2 toward the center portion thereof" indicates, for example, a case where the slidable operation portion 88 is operated from the front portion as the current position of the slidable operation portion 88 of the lid body 2 toward the position of the center portion or the slidable operation portion 88 is operated in the up direction or the down direction.

What is claimed is:

1. A lid attached storage device comprising:
  a box body having an opening;
  a pair of left and right lid bodies configured to cover left and right sides of the opening; and
  a pair of left and right opening and closing mechanisms configured to respectively cause the pair of left and right lid bodies to be slidable in the front and rear direction and rotatable in the up and down direction with respect to the box body, each of the pair of left and right opening and closing mechanisms including:
    a base member, provided between the box body and the lid body;
    a rotational support portion configured to support the base member so as to be rotatable in the up and down direction about a left or right side of the box body with respect to the box body; and
    a slide portion configured to slide the lid body in the front and rear direction with respect to the base member.

2. The lid attached storage device according to claim 1, wherein:
  the opening and closing mechanism further includes:
    a rotation locking mechanism configured to lock the rotation of the base member with respect to the box body and release the rotation locking state; and
    a slide locking mechanism configured to lock the slide of the lid body with respect to the base member and release the slide locking state; and
  the rotation locking mechanism and the slide locking mechanism are provided in each of the pair of left and right lid bodies.

3. The lid attached storage device according to claim 2, wherein:
  the rotation locking mechanism includes:
    a rotation locking portion configured to lock the rotation of the base member with respect to the box body;
    a rotational operation portion configured to release the locking operation of the rotation locking portion; and
    a rotation transmission portion, provided between the rotation locking portion and the rotational operation portion, configured to transmit an operation of the rotational operation portion to the rotation locking portion;
  the slide locking mechanism includes:
    a slide locking portion configured to lock the slide of the lid body with respect to the base member;
    a slidable operation portion configured to release the locking operation of the slide locking portion; and
    a slide transmission portion, provided between the slide locking portion and the slidable operation portion, configured to transmit an operation of the slidable operation portion to the slide locking portion;
  the slide transmission portion and the rotation transmission portion have an overlapping region therebetween; and
  at least one of the slide transmission portion and the rotation transmission portion includes an avoiding component configured to avoid an interference between any one of the slide transmission portion and the rotation transmission portion and the other of the slide transmission portion and the rotation transmission portion in the overlapping region.

4. The lid attached storage device according to claim 3, wherein:
  the rotational operation portion and the slidable operation portion are disposed at a front portion of the lid body; and the rotational operation portion is adapted to be operated toward the rotational support portion of the lid body and the slidable operation portion is adapted to be operated from the front portion of the lid body toward a center portion of the lid body.

\* \* \* \* \*